R. W. GALLAGHER.
AUTOMATIC BILLING MACHINE FOR METERS.
APPLICATION FILED JULY 12, 1907.

960,533.

Patented June 7, 1910.
7 SHEETS—SHEET 1.

WITNESSES:

INVENTOR,
R. W. Gallagher
BY
F. M. Wright,
ATTORNEY.

R. W. GALLAGHER.
AUTOMATIC BILLING MACHINE FOR METERS.
APPLICATION FILED JULY 12, 1907.

960,533.

Patented June 7, 1910.
7 SHEETS—SHEET 2.

Fig. 3

WITNESSES:
Geoffrey Holt
N. Keating

INVENTOR,
R. W. Gallagher,
BY
F. M. Wright,
ATTORNEY.

R. W. GALLAGHER.
AUTOMATIC BILLING MACHINE FOR METERS.
APPLICATION FILED JULY 12, 1907.

960,533.

Patented June 7, 1910.
7 SHEETS—SHEET 3.

WITNESSES:
Geoffrey Holt
N. Keating

INVENTOR,
R. W. Gallagher
BY
F. M. Wright,
ATTORNEY.

R. W. GALLAGHER.
AUTOMATIC BILLING MACHINE FOR METERS.
APPLICATION FILED JULY 12, 1907.

960,533.

Patented June 7, 1910.
7 SHEETS—SHEET 4.

WITNESSES
Geoffrey Holt
N. Keating

INVENTOR,
R. W. Gallagher,
By J. M. Wright,
ATTORNEY.

R. W. GALLAGHER.
AUTOMATIC BILLING MACHINE FOR METERS.
APPLICATION FILED JULY 12, 1907.

960,533.

Patented June 7, 1910.
7 SHEETS—SHEET 5.

UNITED STATES PATENT OFFICE.

RICHARD WILLIAM GALLAGHER, OF LOS ANGELES, CALIFORNIA, ASSIGNOR TO AUTOMATIC BILLING COMPANY, OF LOS ANGELES, CALIFORNIA, A CORPORATION OF CALIFORNIA.

AUTOMATIC BILLING-MACHINE FOR METERS.

960,533.

Specification of Letters Patent.

Patented June 7, 1910.

Application filed July 12, 1907. Serial No. 383,508.

*To all whom it may concern:*

Be it known that I, RICHARD WILLIAM GALLAGHER, a citizen of the United States, residing at Los Angeles, in the county of Los Angeles and State of California, have invented new and useful Improvements in Automatic Billing-Machines for Meters, of which the following is a specification.

The object of the present invention is to provide an apparatus which can be attached to any meter, such as a gas or electric meter, without materially changing the construction of the meter itself, which, when suitably operated by a bill collector or other person, will record the amount of the commodity measured by the meter consumed since the last such previous operation, and will also record the cost of the same at a given rate, and also the date of making the record; from which, at such operation, a number of such records can be taken from the machine, while one such record can be retained in the machine for future reference; which will provide means for insuring that the recording devices are reset to zero after each record has been taken; and one which will be easy and convenient to replenish with record rolls, when necessary.

A particularly important feature of the invention resides in the provision for automatically rendering a record of the cost of the commodity at a price previously determined, as well as the amount thereof consumed.

Another important feature consists in the provision of mechanism whereby, although the motion of the meter mechanism is continuous, or practically so, the recording devices, both as to the amount and as to the cost, advance only when such amount and cost have reached predetermined magnitudes, as, for instance, exact cents, dimes, and dollars in the cost, and exact units, tens, hundreds, and so forth in the amount.

In the accompanying drawings, Fig. 4 is a side view of the mechanism, a side wall thereof being removed, the front cover being partly open.

Referring to the drawing, 1 indicates the meter case to which the bill delivery mechanism is attached. Said meter is here shown as for gas, but the invention is not limited thereto, but may be applied for recording the speed of any rotating shaft or of a reciprocating device.

Figure 3:
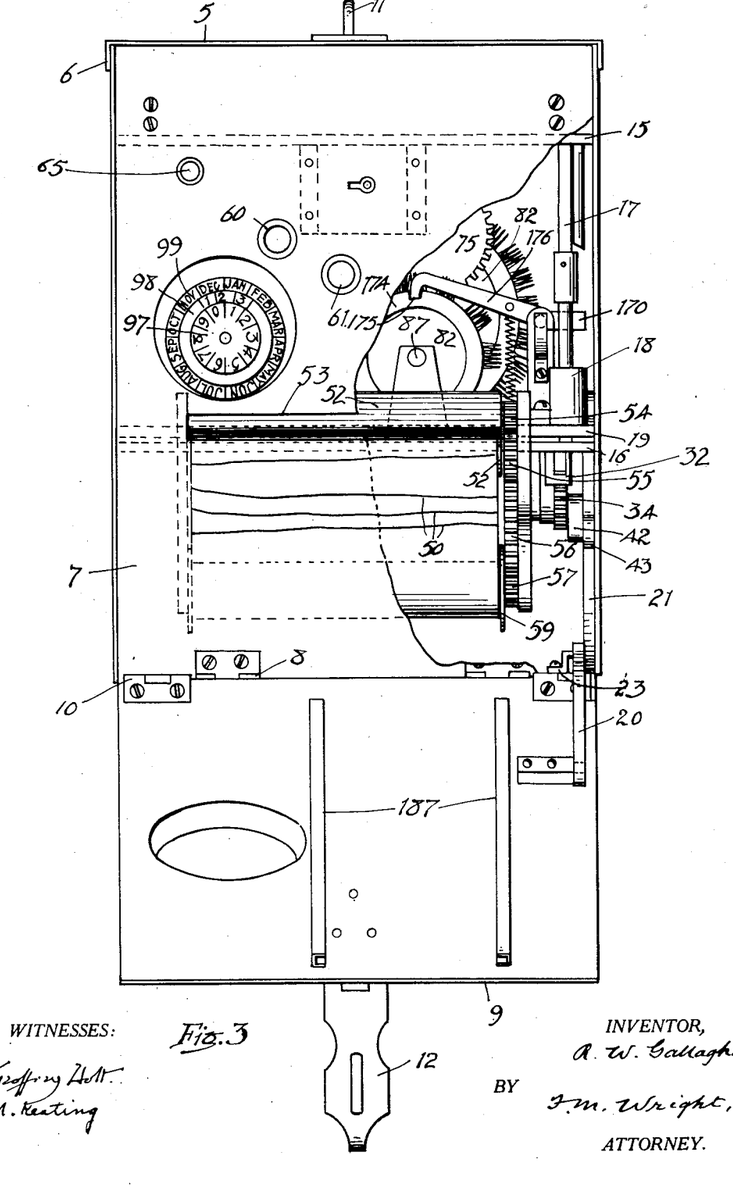
Fig. 3 is a broken front view of the mechanism, the front cover being lowered, and the recording devices being shown in their lowered position.

The casing of the bill delivery mechanism comprises the bottom 2, bent up at its edges, as shown at 3, (Fig. 10) to form vertical supports, side walls 4 secured to said supports, a top 5 having downwardly extending flanges 6 (Fig. 3) secured to said side walls, a front wall 7 hinged, as shown at 8, to the inner surface of the bottom, and a front cover or door 9, hinged, as shown at 10, (Fig. 8) to the under or outer surface of said bottom. The front cover and the top are provided, one with a staple 11 and the other with a slotted hinge strap 12, adapted to pass over said staple, to which it can be secured by a suitable padlock. The side walls 4 are secured to small brackets 13, (Fig. 1) attached to the front of the meter case, and by this means the mechanism is supported on the meter case.

Figures 5, 6, 7:
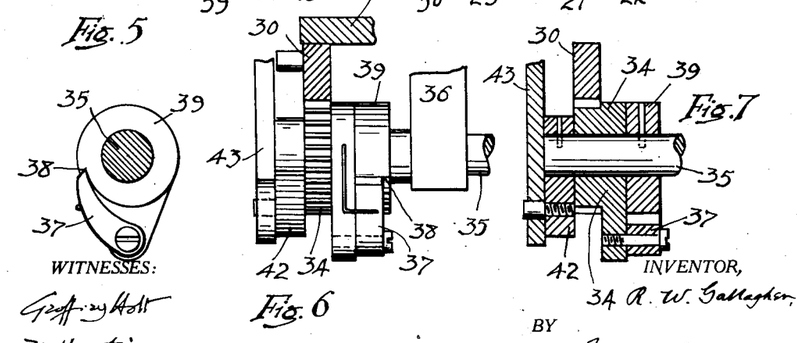
Fig. 5 is a detail cross-sectional view showing the pawl and notch connection interposed between the front cover and the support for the recording means.
Fig. 6 is a detail side view of the same.
Fig. 7 is a detail longitudinal section.
Figure 8:
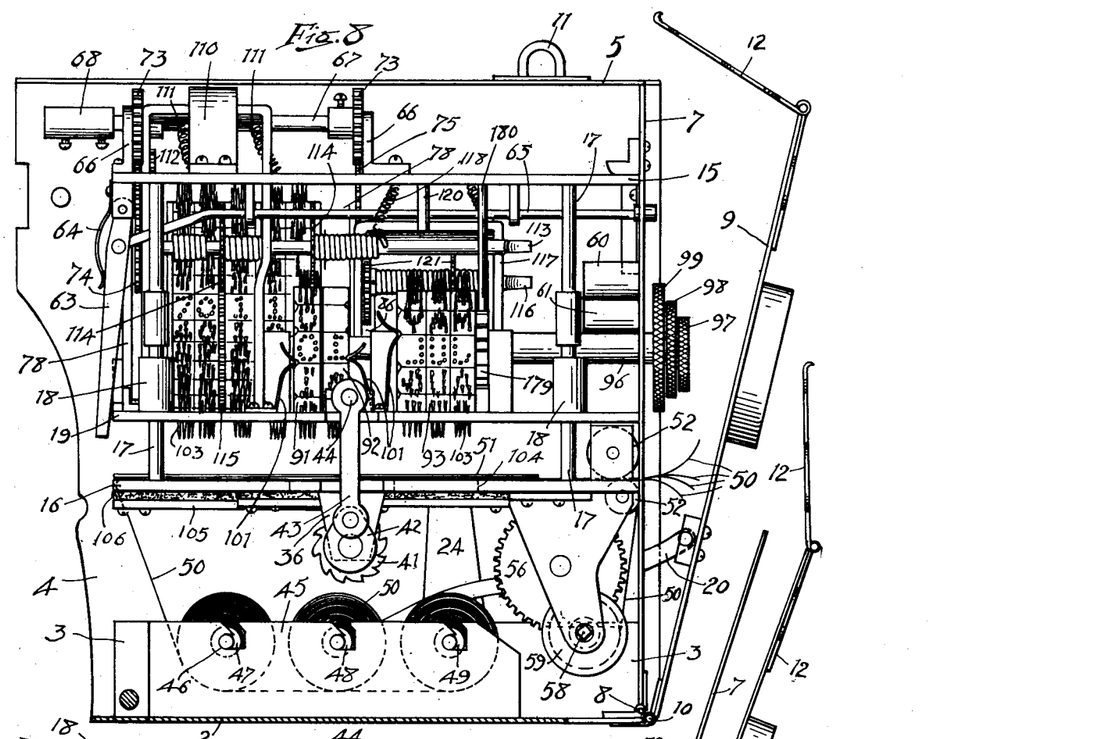
Fig. 8 is a view, similar to Fig. 4, of the other side of the machine.
Figure 10:
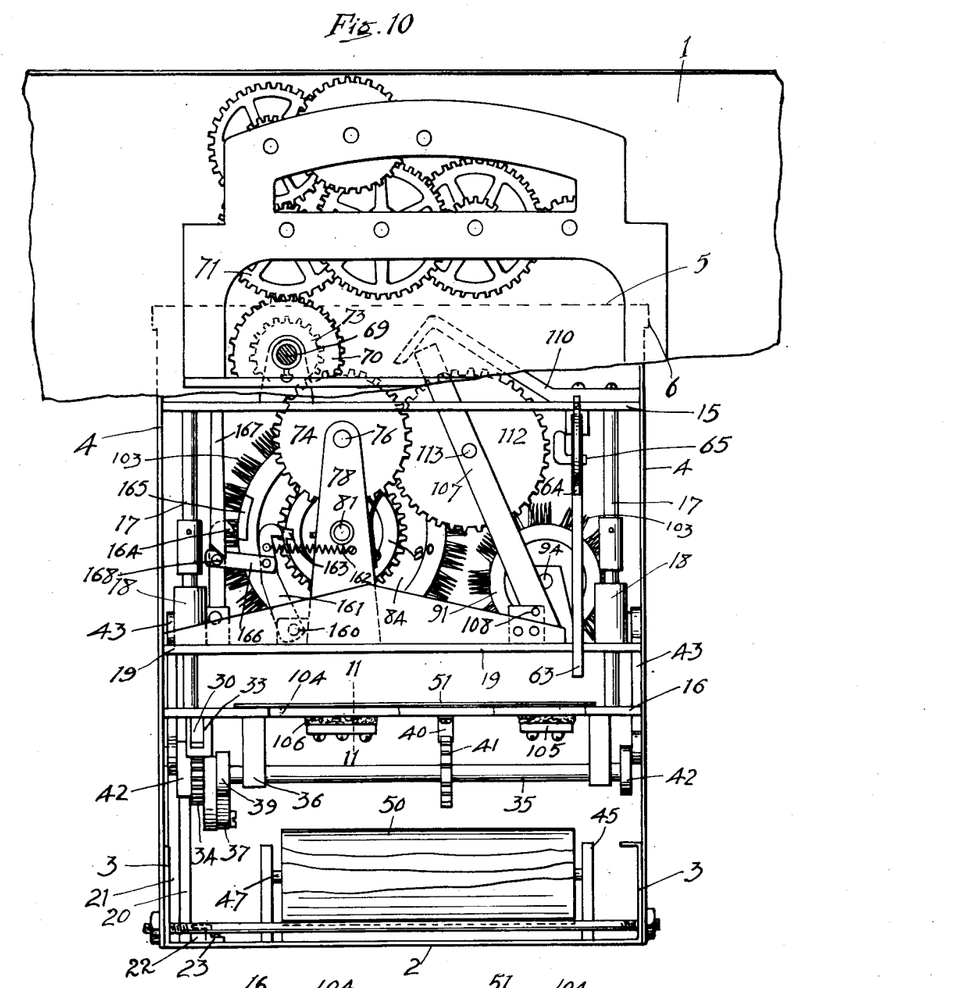
Fig. 10 is a view of the mechanism looking from the rear, that is, the side adjacent to the meter.
Figure 11:
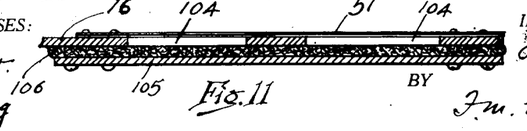
Fig. 11 is a detail longitudinal section on the line 11—11 of Fig. 10.

Secured to the side walls 4 are the upper and lower plates 15, 16, of the main frame of the mechanism, said plates being secured together by four vertical posts 17, and upon said posts slide sleeves 18 secured to a carrier plate 19, which carries means for perforating or otherwise marking the multiplicate bills. By the opening of the front door or cover 9, said frame is caused to automatically descend into proximity with the lower plate 16, there being pivotally attached to the rear side of said front door the front end of a link 20, the rear end of which is connected to a slide piece 21 by a pivot pin 22, one end of which is extended to pass into a guideway 23, which serves to hold down said extension and the end of the slide piece. Said slide piece is formed at the front end with an upwardly extending arm 24, which is pivotally attached, as shown at 25, (Fig. 4), to a lever 26, pivoted to the main frame of the mechanism at a point 27 near the top plate 15 thereof. The lower end of the lever is formed with a slot 28, into which passes a pin 29 extending laterally from a rack 30 moving in front and rear guideways 32, 33, depending from the lower plate 16. Said rack engages a pinion 34 which revolves loosely upon a shaft 35, (Figs. 6, 7,) which has its bearings in lugs 36 depending from the lower plate 16 and carries a spring-actuated dog 37 adapted to engage a notch 38 formed in the periphery of a disk 39 fast on said shaft. Thereby a rotary motion of the pinion in one direction imparts a corresponding rotation to the disk 39 and to the shaft 35, while the pinion can freely return in the opposite direction without turning said shaft, the return movement of the shaft 35 being prevented by a dog 40 carried on said lower plate 16 and engaging the teeth of a ratchet wheel 41 on said shaft (Figs. 8, 10). Upon the ends of the shaft 35 are secured cranks 42 which are pivotally connected to the lower ends of links 43, the upper ends of which are connected to pins 44 secured to the movable carrier plate 19. It will readily be seen that, as the front door swings forward and downward, the link 20 and slide piece 21 move forward, causing the lever 26 also to swing forward, and therefore also the rack 30. The proportions of the above mentioned parts and of the pinion are such that a complete forward movement of the door produces a complete revolution of the pinion, and therefore also a complete vertical reciprocation of the plate 19. When the door is closed again, no further motion is imparted to said plate 19, because the pinion then rotates in the reverse direction and its pawl freely passes over the notch 38 in the disk 39 without imparting rotation thereto.

Supported on the bottom of the mechanism casing are walls 45 having formed in their upper edges suitable recesses 46 to receive the axles of three rollers 47, 48, 49, around which are wound five recording sheets 50, one on each of the rollers 48, 49, and three on the roller 47. These sheets pass from said rollers over the bottom plate 16 and beneath a retainer plate 51, four of them then passing between two delivery rollers 52 and out through a slot 53 in the front wall of the mechanism casing. Said rollers 52 are caused to revolve with each other by means of gear wheels 54, 55, (Figs. 3, 4,) meshing with each other, the lower gear wheel 55 meshing also with an intermediate wheel 56, which in turn meshes with a pinion 57 upon a shaft 58 carrying a record winding roller 59. The shaft 58 is thus driven from the delivery rollers as the latter are moved by drawing out from between the said four record sheets. The fifth sheet passes to the record winding roller 59 and is wound up thereon to serve as a check or reference. The other four sheets, having marked thereon information in regard to the amount and cost of gas or other commodity consumed, are torn off by the collector, who presents one of them to the consumer as a bill and collects the amount thereon, turns into the office of the company supplying the commodity two other of the record sheets, and retains one for his own protection. The delivery rollers may be rotated either by drawing out the four sheets, or directly, by applying a key to the end of the shaft 58 of the record winding roller 59.

It will have been understood from the foregoing description that, when the door 9 is fully opened, the carrier plate carrying the record marking devices has been completely reciprocated and returned to its uppermost position, and that the marking of the records is effected when the front door is opened about half way. Before drawing out and removing the records thus marked, and after they are marked, the collector should reset all the marking wheels to zero. In order to remind the collector of this duty, and insure that he does not fully open the door and remove the record sheets before resetting, there is provided a pivoted arm 63 depending from the top plate 15 of the mechanism frame, the lower end of said arm being, by means of a spring 64, automatically moved over the movable plate 19, when the latter has been sufficiently depressed, to resist the return thereof until positively removed from above said plate. When the plate 19 is in this position, the resetting shafts 113, 116, hereinafter more particularly described, are respectively opposite to apertures 60, 61, in the front wall 7, so that the collector, by means of a winding key applied in succession through said apertures, resets all the marking wheels to zero. The collector then removes the arm 63 from its obstructive position, for which purpose there is provided a rod 65 attached at its rear end to said arm, the front end extending through a hole in the front cover, so that the collector, by pushing on said front end, can release the plate 19. The collector then fully opens the door 9, and removes the record sheets.

Figures 1, 2:
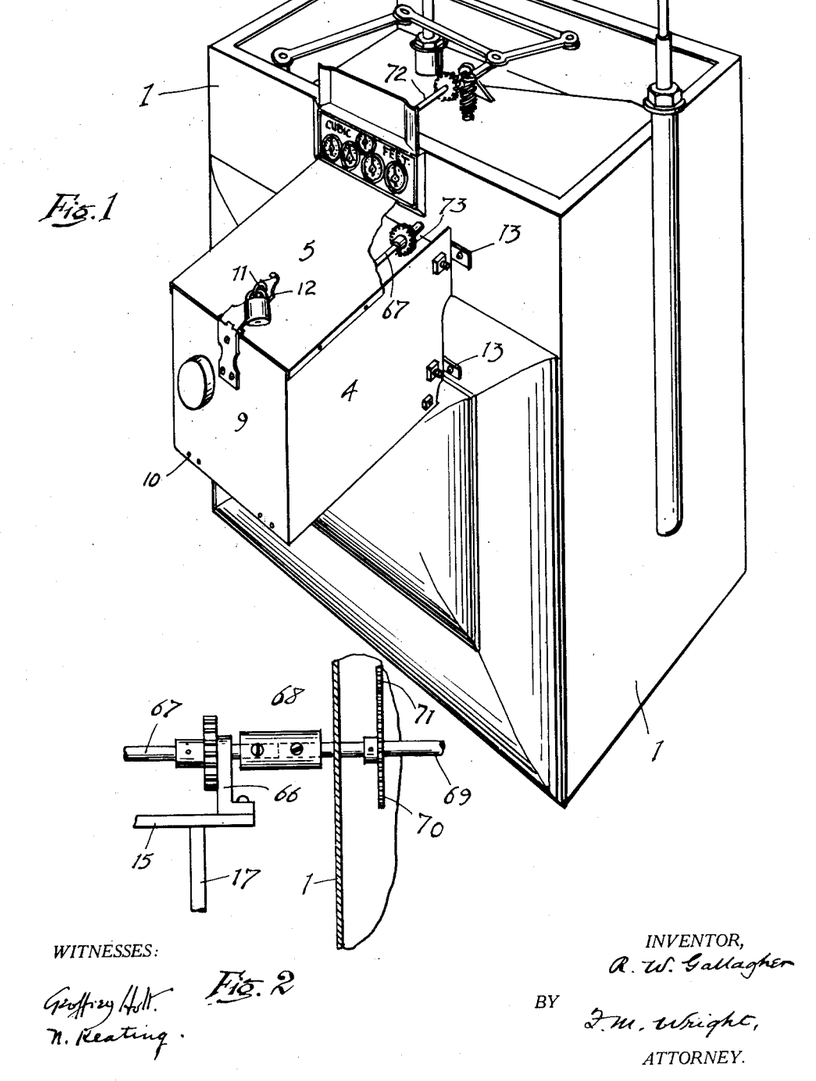
Figure 1 is a perspective view, showing a gas meter with my apparatus attached thereto, the top of the gas meter being removed, and the casing of the apparatus being broken away.
Fig. 2 is an enlarged detail side elevation, partly in section, showing the connection of the mechanism shaft with a shaft of the meter.
Figure 9:
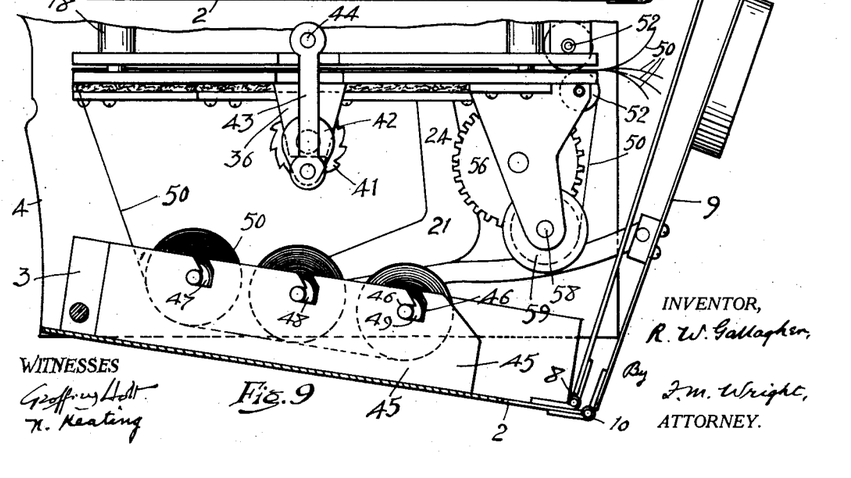
Fig. 9 is a broken side view, similar to Fig. 8, showing the bottom of the mechanism casing partly lowered.

Upon the top of the upper plate 15 are secured bearings 66 for a shaft 67, which is adapted to be connected by a coupling 68 (Fig. 2) with a shaft 69. In a gas meter, said shaft 69 is driven by means of a gear wheel 70 from the gear wheel 71 on the shaft of the hundreds dial, and which forms part of the train of the dial mechanism, (Fig. 9), which is driven in the ordinary way or from the shaft 72 (Fig. 1). Thereby a motion of revolution is imparted to the shaft 67 and to two gear wheels 73 thereon. When the movable plate is in its uppermost position, said gear wheels 73 can mesh with gear wheels 74, 75, mounted on stud shafts 76, 77, in standards 78 supported upon the movable plate 19.

The gear wheel 74 has formed integral therewith a pinion 79 which meshes with a gear wheel 80 loose on a fixed shaft 81 and thus imparts an intermittent rotary motion to said shaft, and to the cost-recording wheels 82, 83, 84, in the manner which will be presently described. In like manner the gear wheel 75 meshes with the gear wheel 86 on a shaft 87 and thus imparts motion to the amount-recording wheels 88, 89, 90, on said shaft. A third set of wheels 91, 92, 93, are mounted upon concentric or nested shafts 94, 95, 96, having secured at their ends milled disks 97, 98, 99, the face of each having marked thereon characters 100 to indicate the date. Thus, the largest milled disk 99 has marked thereon the initial letters of the month, and the other two have marked thereon respectively the tens and units of the days of the month. All of these dating wheels are, by means of springs 101, which enter notches 102 formed in the sides of said wheels, positively prevented from moving backward, and also from moving forward except when positively advanced by mechanism for that purpose. All of these wheels, the cost-recording, the amount-recording, and the dating wheels, have extended from their peripheries perforating pins 103, which are adapted to perforate the record sheets, and the lower plate 16, and also the retainer plate 51, are formed with apertures 104 (Figs. 7, 9, 10, 11,) beneath the respective sets of recording wheels; and secured to said plate 16, across and beneath said apertures, are blocks 105 which support pads 106 of felt or the like, adapted to receive without injury the points of the perforating pins.

Figure 13:
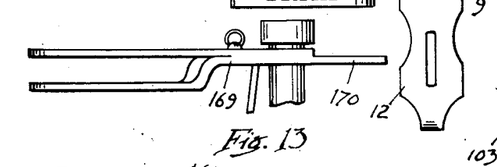
Fig. 13 is a detail top plan view and Fig. 14 is a side view of one of the dogs for the amount recording wheels.
Figure 14:
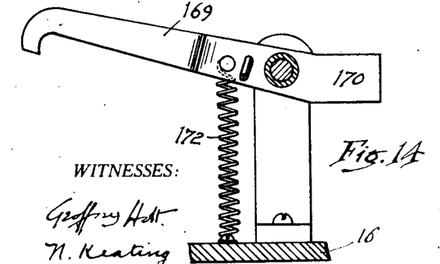
Figure 15:
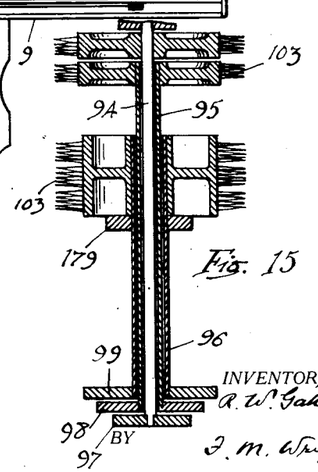
Fig. 15 is a longitudinal section through the dating wheel shafts.

When the movable plate 19 descends, the gear wheels 80, 86, move out of engagement with the pinion 79 and gear wheel 75. At the same time the upper portion of a yoke 107 (Figs. 4, 8, 12,) pivoted at 108 on said plate 19, moves out of engagement with the beveled or wedged shaped lip 109 of a fixed arm 110, permitting said yoke to swing toward the cost-recording wheels, which it does under the action of springs 111, thereby causing a resetting wheel 112 on a shaft 113 (Figs. 4, 8, 12) to move into engagement with the gear wheel 80 and also resetting wheels 114 on the same shaft to move into engagement with gear rings 115 secured upon the cost-recording wheels of the higher denominations. In like manner, for the amount recording wheels, there is provided a resetting shaft 116 having bearings in a yoke 117, (Figs. 2, 8, 11) drawn toward said amount-recording wheels by means of springs 118, and adapted to be moved therefrom by means of the wedge-shaped lower end 119 of a piece 120 depending from the upper plate 15. Said lower end, engaging the cross piece of the swinging yoke 117, moves said yoke away from said amount-recording wheels against the action of said springs 118. Said shaft 116 has thereon gear wheels 121 adapted to engage respectively gear wheels 122 formed upon the amount-recording wheels. Each of said resetting gear wheels is mounted loosely upon its shaft, and is connected therewith only through the medium of a coiled spring 124, thereby permitting the shaft to continue rotating after the resetting gear wheel has been arrested and the recording wheel has been brought back to zero. Said recording wheels are automatically arrested at their zero position in the following manner:

Pivoted at 160 (Fig. 10) is a dog 161 normally drawn toward the wheel 80 by a spring 162. In a circular portion of said wheel 80 is a notch 163, and said dog, when engaging said notch, arrests the wheel in a position corresponding to the zero position of the wheel 82. There is likewise provided a pivoted dog 164 adapted to engage a notch 165 in the periphery of said latter wheel 82. These dogs are connected by a link 166, so that they move in unison. In the normal position of the mechanism, that is, except at the time when the operator is taking a record, these dogs are maintained out of engagement with the respective notches by means of a depending bar 167, the wedge-shaped lower end of which engages a pin 168 carried by said link 166, and thus moves said dogs out of engagement with said notches. As soon as the carrier plate descends, upon beginning to take a record from the mechanism, said pin 168 leaves the wedge-shaped end of the bar 167 and said dogs, moving inward under the action of the spring, are in readiness to engage said notches. The first wheel of the amount recording series is, in like manner, arrested, when brought back to zero, by means of a dog 169, a rearwardly extending arm 170 of which is adapted to be engaged by a bar 171 depending from the plate 15. Said dog 169 is forked or double as shown in detail in Figs. 13 and 14, so as to engage notches in two disks, and is actuated by a spring 172. In like manner, upon each of the second recording wheels 83, 89 and third recording wheels 84, 90, is secured a disk 174 (Figs. 4, 12) having a notch 175, and there is provided a spring actuated dog 176, arranged to bear upon said disk when the carrier plate is in its lower position, and to engage the notch 175 when the latter is brought opposite to the dog by the movement of the resetting wheel. Each dog 176 is also maintained out of engagement with its disk when the parts are in their normal position, this being effected by an arm 178 extending laterally in front of an arm on the shaft of the dog 176, from a dog for a wheel of lower denomination, so that, when the latter dog is pushed away from its recording wheel, said arm 178 withdraws also said dog 176 from its disk and notch. It will thus be seen that, as the resetting wheels are set in motion to return the recording wheels to zero, a wheel of a higher denomination can not be arrested in its zero position until the wheels of lower denominations have been successively arrested at such position. If, however, a wheel is so arrested, the dog arresting the same releases the dog corresponding to the wheel of the next higher denomination and permits it to engage the notch of said wheel the next time that said notch comes opposite to said dog in the rotation of the wheel.

The date recording wheels may be turned independently by hand in the manner already explained, but, since collections are generally made once a month, and on the same day of the month, it is desirable to advance the wheel recording the month one division each time that the record is taken, thus avoiding the trouble of making the necessary advance by hand. In order to accomplish this, said wheel has secured thereto a ratchet wheel 179, which, upon the upward movement of the carrier plate, is adapted to be engaged by a downwardly extending pawl 180 to advance said ratchet wheel and the month recording wheel one division.

187 indicates strengthening ribs for the front door or cover.

Figures 19, 20, 21, 22, 23, 24:
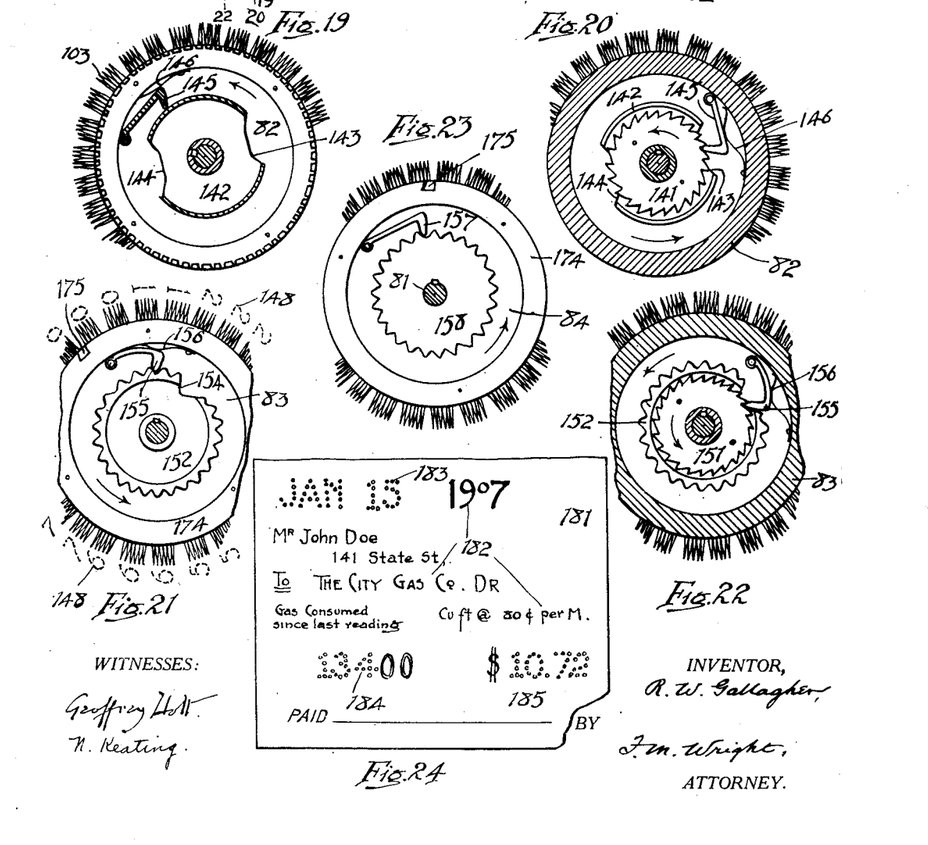
Fig. 19 is a section on the line 19—19 of Fig. 16.
Fig. 20 is a section on the line 20—20 of Fig. 16.
Fig. 21 is a side view of the second cost recording wheel and cam disk.
Fig. 22 is a section on the line 21—21 of Fig. 16.
Fig. 23 is a view similar to Fig. 21 of the third cost recording wheel and the star wheel used therewith.
Fig. 24 is a view of a bill as prepared by the machine.

181 indicates a bill prepared by the machine. It contains previously printed matter 182 common to all the bills, and on it are formed by the machine perforations 183 indicating the date, perforations 184 indicating the amount consumed, and perforations 185 indicating the cost to the consumer.

I will now describe the construction and mode of operation of the cost recording wheels. The apparatus here shown is arranged for recording the cost of 80 cents per thousand feet of gas, but may be varied for different prices of gas.

Figure 12:
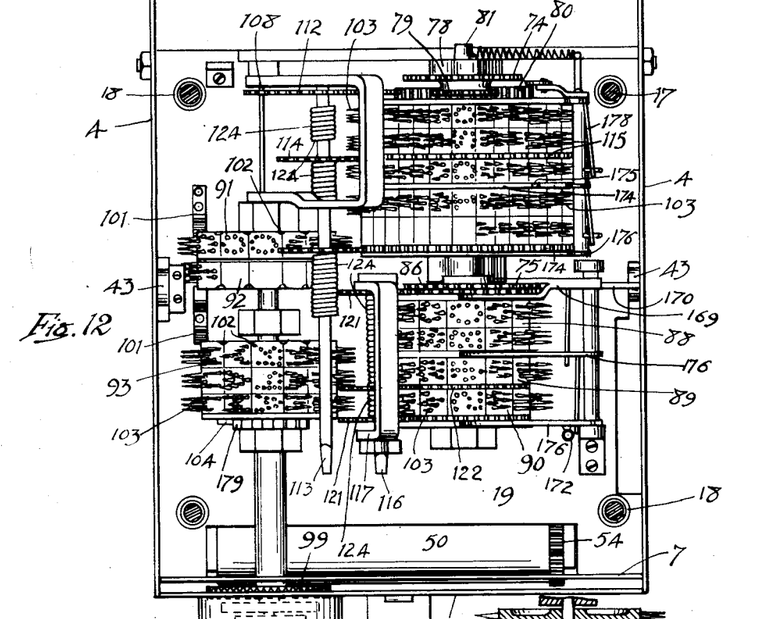
Fig. 12 is a horizontal section taken above the recording mechanism.
Figure 16:
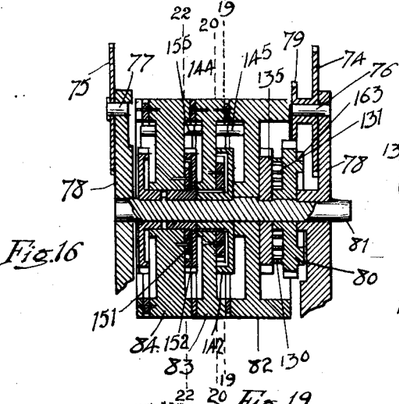
Fig. 16 is an axial section of the cost recording wheels.
Figures 17, 18:
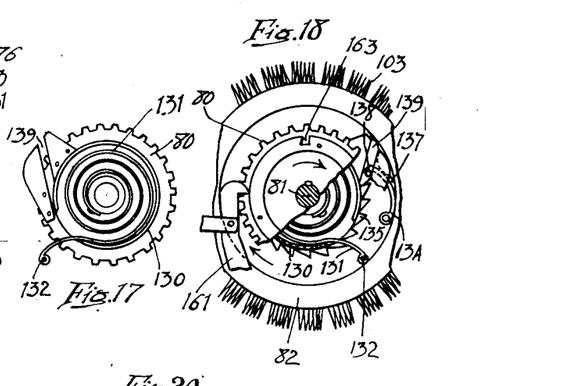
Fig. 17 is a side view of a gear wheel used in connection with said cost recording wheels.
Fig. 18 is a broken view of the same and of the first recording wheel looking from the opposite side to Fig. 17.

The gear wheel 80 has formed on the inner side thereof a crown ring 130, (Figs. 16, 17, 18) within which is retained a coiled spring 131 fastened at its inner end to the hub of said wheel. The outer end of said spring is attached to a pin 132, extending from the side of the first wheel 82 of the cost-recording series. Said latter wheel 82 turns loosely upon the fixed shaft 81. It would result from the above construction that, as the gear wheel turns, continuously with the meter mechanism, the first wheel 82 of the series would also turn continuously with it. This, however, is prevented, and a continuous rotary movement of the wheel 80 is converted into an intermittent rotary movement of the wheel 82, by means of a dog 134 carried by the wheel 82 which, by means of a spring 137, is normally caused to engage a ratchet wheel 135 fixed upon the stationary shaft 81, said dog having a pin 138 extending laterally therefrom into an oblique slot 139 formed by an extension at the side of the gear wheel 80, so that, after said gear wheel has advanced an angular distance corresponding to a recording division of the wheel 82, said dog by its engagement with said slot is moved out of engagement with the fixed ratchet wheel, whereupon the wheel 82 is no longer held back by said fixed ratchet wheel, but immediately springs forward under the action of the coiled spring 131, the dog 134 then again moving inward and engaging the next tooth, in advance, of the ratchet wheel. In this manner intermittent rotary motion is imparted to the wheel 82. Said wheel 82 is formed with twenty-five divisions, corresponding to the figures of the cents in the cost of twenty-five different amounts of gas at 80 cents a thousand cubic feet, the pins 103 of the first division being arranged to perforate the figures "08" for 100 feet of gas; the second "16" for 200 feet; the third "24" for 300 feet; and so on, for twelve advances of the cents-recording wheel, the last bringing said wheel to the record "96" for 1200 feet; but then a transfer must be made to the next cost-recording wheel 83, which records the dollars, and said wheel 83 must be advanced one division to indicate the cost, 1 dollar, and 4 cents for 1300 feet. No further change would then be necessary in the second wheel 83 of the series during eleven more changes of the cents-recording wheel 82 corresponding to the successive costs by hundreds from 1300 feet to 2400 feet, inclusive; but then another change or advance would be necessary in the dollars-recording wheel 83 to record the cost of 2500 feet, namely $2.00. It will thus be seen that, for the first thirteen cost-marks of the cents-recording wheel 82, extending from the record "00" to the record "96," no movement need be imparted to the dollars-recording wheel 83, but, on the thirteenth movement of the cents-recording wheel 82, the dollars-recording wheel 83 must be advanced one division to bring it to the numeral "1" to perform its part in recording the cost $1.04. Then, on the twelfth succeeding movement of the cost-recording wheel the dollars-recording wheel must be again advanced to bring it to the numeral "2" so as to record the cost of $2.00. It will also be seen that the cents marks repeat themselves in the same order for costs in successive hundreds of cubic feet from $2.00 to $4.00 and then again from $4.00 to $6.00, and so on indefinitely. Therefore these movements have to be repeated indefinitely, first, thirteen movements of the cents-recording wheel, before advancing the dollar-recording wheel one division, then twelve movements, then thirteen movements, and so on. To obtain this result I provide the following construction:

Upon the inner face of the second wheel 83, by which is meant the face nearest to the source of movement, is secured a ratchet wheel 141 having twenty-five teeth. Upon the shaft between the cents-recording wheel 82 and the dollars-recording wheel 83 is secured a cam disk 142, having formed therein diametrically opposite recesses 143, 144, of which the shorter recess 143 takes up about two twenty-fifths of the circumference of the disk and thus corresponds in angular distance with two teeth of the ratchet wheel 141, while the longer recess 144 is of a length corresponding with three of said teeth. Upon the outer side of the cents-recording wheel, that is, the side next to the wheel 83, is pivoted a pawl 145, normally pressed inward by means of a spring 146. Suppose that the cents-recording wheel 82 is set at zero, so as to give a record .00, then upon the complete passage of 100 feet of gas through the meter, said wheel is, by the mechanism already explained, turned through one twenty-fifth of a revolution, so as to mark "08." Upon the passage of 200 feet it is turned so as to mark "16," and so on, up to the passage of 1200 feet through the meter when the wheel has been turned so as to mark "96." During the whole of this movement the nose of the pawl 145 has been passing over the circular periphery of the cam 142 and has thereby been held out of engagement with the teeth of the ratchet wheel 141 secured upon the dollars-recording wheel. But, in advancing to the last named position, the pawl reaches the shorter recess 143 and drops thereinto. It is thereby permitted to engage the teeth of the ratchet wheel, so that on its next advance from the point corresponding to the mark .96, the cents-recording wheel 82 carries with it the dollars-recording wheel 83 through one twenty-fifth of a revolution, and thereby moves said wheel 83 from a position marking zero to a position marking "1." It has already been shown that the impression made by the dollars-recording wheel 83 should not be changed for the next twelve impressions made by the cents-recording wheel 82, that is, for the movements of said wheel by which it is able to make the impressions "12" for 1400 feet, "20" for 1500 feet and so on up to "92" for 2400 feet. This result could have been obtained by making the cam recess 143 so short that, by the next movement of the cents-recording wheel, after making the impression .04 corresponding to 1300 feet, the pawl 145 would be forced out of the cam recess 143 and thereby also be moved out of engagement with the ratchet wheel 141 so that thereafter said dollars-recording wheel would not move with the cents-recording wheel, until the pawl again dropped into a cam recess. The impracticability of this arrangement will, however, appear from the following considerations. The wheel 82 advances one twenty-fifth of a revolution at each step, and therefore, the wheel 83, when moved by the wheel 82, must also advance one twenty-fifth of a revolution. It is therefore necessary to divide the periphery of said wheel 83 into twenty-five divisions. Now these twenty-five divisions cannot be arranged to record the digits "0" to "9" in continuous succession, around the wheel repeatedly. It is for this reason that the first cam recess 143 is made of the same width as two of the teeth of the ratchet wheel, and the other one 144 is made of the same width as three of such teeth, there being the two cams recesses on each side an intervening circular portion corresponding in extent to ten of the teeth of the ratchet wheel, so that when, after the first of the above changes, the cents-recording wheel makes its second movement, corresponding to the indication .12 for 1400 feet, the dollars-recording wheel moves with it, through one twenty-fifth of a revolution. And as it is now necessary to mark the same amount of dollars as before, namely, $1.00, the pins which mark the numeral "1" are repeated at this point on the wheel 83. When the cents-recording wheel makes its next advance, from the position indicating "12" for 1400 feet, to the position indicating "20" for 1500, the pawl 145 is then lifted out of its cam recess 143, and out of engagement with the ratchet wheel 141, so that the dollars-recording wheel remains in the same position as before, and continues to give the impression "1." This remains the case also for the next nine advances, ten in all, until the pawl drops into the other cam recess 144, so that it again engages the ratchet wheel 141, and upon the next advance of the cents-recording wheel the dollars-recording wheel 83 is also advanced, and is moved into position indicating "2." Since this cam recess 144 is of a length corresponding to three of the teeth of the ratchet wheel, the dollars-recording wheel 83 is advanced twice more with the advance of the cents-recording wheel, and it is therefore necessary to form on the periphery of said wheel, two more sets of pins to perforate the impression "2." The same arrangement is now repeated with the succeeding numerals, that is to say, the dollars-recording wheel is provided with pins perforating two numerals "3," three numerals "4," two numerals "5," and so on, two of the odd numerals and three of the even numerals. This arrangement of the pins on the wheel 83 is seen in Figs. 4, 8, and 12 and is also indicated diagrammatically at 148 in Fig. 21.

With the necessary changes the same system can be applied when the gas is sold at other rates than 80 cents per thousand cu. ft.

To indicate the cost of gas when it reaches the sum of $10.00 and over, there is provided a third wheel 84, which carries on its periphery pins for perforating the numerals "0," "1," "2," etc., up to "24." This wheel 84 is advanced one twenty-fifth of a revolution for each complete advance of the dollars-recording wheel, for which purpose there is secured to the inner side thereof a ratchet wheel 151 having twenty-five teeth. Secured upon the shaft between the wheels 83 and 84 is a star wheel 152 having twenty-five divisions, each occupied by a point or star except where the edge is cut out to form a notch or cam 154 equal to the width of one star. Secured upon the outer side of the dollars-recording wheel 83 is a pawl 155 normally pressed inward by means of a spring 156. One function of the star wheel 152, that performed by the recesses between its stars, is to maintain the dollars-recording wheel in its proper place, this being done by the engagement of the spring-actuated pawl 155 with each of said recesses in succession of said star wheel. But, once in each revolution of the dollars-recording wheel, the pawl 155 drops into the notch 154 and thereby engages the ratchet wheel 151 secured to the third wheel 84, and, while the pawl is in said notch, said third wheel is advanced with the dollars-recording wheel through one twenty-fifth of a revolution. When it is so advanced, the pawl is moved out of the notch 154, and the third wheel 84 is not again advanced until the dollars-recording wheel has made a complete revolution. In order to retain the third wheel in the position to which it has been advanced, there is carried on its outer side a spring-actuated pawl 157 which, in like manner with the pawl 155, engages a fixed star wheel 158 having twenty-five teeth.

It has already been stated that the amount recording wheels 88, 89, 90 are advanced from one of the gear wheels 73 by means of a gear wheel 75 which meshes with a gear wheel 86 on a shaft 87. The method by which these amount recording wheels 88, 89, 90 are advanced is precisely the same as that disclosed in my British Patent, No. 9652 of May the 8th, 1905, and need not be herein further specified. In the manner shown in said British patent an intermittent rotary motion is transmitted to said amount recording means from the continuous rotary motion of the shaft 67 and the gear wheel 73.

I claim:—

1. In an apparatus of the character described, the combination of a meter case, a recording mechanism, a casing therefor, means for attaching said casing to said case, a driving shaft for said mechanism, a meter shaft, a detachable connection for said shafts, marking devices actuated by said driving shaft, means for supplying record sheets to said marking devices, a closure for said mechanism, means actuated by the movement of said closure for operating said marking devices to mark said record sheets, and means for discharging the record sheets so marked, substantially as described.

2. In an apparatus of the character described, the combination of a meter case, a mechanism frame, a casing therefor, means for supporting said casing upon said case, said mechanism frame comprising a suitable guide, a carrier adapted to move along said guide, means for marking bills, supported on said carrier, the casing of said mechanism having a movable front door or cover, and means automatically operated by the opening of said door to cause said carrier to reciprocate to mark said bills, said means comprising a link attached to the rear side of said door, a lever, means actuated by the forward movement of the link to swing said lever, a rack actuated by said lever, a pinion engaged by said rack, and a connection between said pinion and the carrier, operative to move said carrier in one direction of said pinion, but inoperative to so move it in the opposite direction thereof, substantially as described.

3. In an apparatus of the character described, the combination of a meter case, a mechanism frame, a casing therefor, means for supporting said casing upon said case, said mechanism frame comprising a suitable guide, a carrier adapted to move along said guide, means for marking bills, supported on said carrier, the casing of said mechanism having a movable front door or cover, and means automatically operated by the opening of said door to cause said carrier to reciprocate to mark said bills, said means comprising a link attached to the rear side of said door, a lever, an operative connection between said lever and the carrier permitting said carrier to be moved by the lever when moving in one direction, the latter being inoperative to move said carrier while moving in the other direction, substantially as described.

4. In an apparatus of the character described, the combination of marking devices, a meter, means for advancing said marking devices from the movement of the meter mechanism, a closure for closing access to said marking devices, means for advancing a record sheet, and means for moving said marking devices to mark said record sheet, comprising a link pivotally connected to said closure, a slidepiece attached to said link, a lever attached to said slidepiece, a rack connected to said lever, a pinion engaged by said rack, a disk, means carried by said pinion for advancing said disk when the pinion rotates in one direction, but inoperative in the other direction of rotation of the pinion, a shaft to which said disk is secured, a crank carried by said shaft, links connected to said cranks, and means for carrying said marking devices connected to said links, substantially as described.

5. In an apparatus of the character described, the combination of a meter mechanism arranged to be actuated by the passage of a fluid, marking devices adapted to be advanced by said meter mechanism, means for advancing a record sheet, a closure for said means, and an operative connection between said closure and the marking devices whereby a complete reciprocation is given to the latter from a movement in one direction only of said closure, its movement in the other direction being inoperative to move said devices, substantially as described.

6. In an apparatus of the character described, the combination of a meter, marking devices, means for detachably connecting said marking devices with the meter mechanism, whereby said marking devices are advanced with the movement of said mechanism, a door or cover, means automatically operated by the movement of said door to reciprocate said marking devices, resetting mechanism for resetting said marking devices to zero, and means for automatically arresting the return movement of the marking devices at a point at which the resetting devices can be operated to reset them to zero, substantially as described.

7. In an apparatus of the character described, the combination of a meter, marking devices, means for detachably connecting said marking devices with the meter mechanism, whereby said marking devices are advanced with the movement of said mechanism, a door or cover, means automatically operated by the movement of said door to reciprocate said marking devices, resetting mechanism for resetting said marking devices to zero, means for automatically arresting the return movement of the marking devices at a point at which the resetting devices can be operated to reset them to zero, and means under the control of the operator for removing the said arresting means, substantially as described.

8. In an apparatus of the character described, the combination of meter mechanism, recording wheels, a connection between said wheels and mechanism, resetting wheels for resetting the recording wheels, means for moving said recording wheels to make a record, and means automatically operated in the movement of said recording wheels to break said connection and connect said recording and resetting wheels, substantially as described.

9. In an apparatus of the character described, the combination of meter mechanism, recording wheels, resetting wheels, means for moving the recording wheels to make the record, an operative connection between said recording wheels and meter mechanism, means for automatically breaking said connection, and connecting the recording wheels with the resetting wheels in the movement in one direction of said recording wheels, and for disconnecting the recording and resetting wheels, and connecting the recording wheels with the meter mechanism on the return movement of said recording wheels, substantially as described.

10. In an apparatus of the character described, the combination of meter mechanism, marking wheels, an operative connection between said meter mechanism and marking wheels, a swinging yoke, a resetting shaft having bearings therein, resetting wheels on said shaft, a support for the marking wheels, a device engaging said yoke in the movement in one direction of said support to shift said yoke to move said resetting wheels out of their operative connection with the marking wheels, and means for causing the marking wheels to be operatively connected with the meter mechanism in the same movement of said support, substantially as described.

11. In an apparatus of the character described, the combination of meter mechanism, recording wheels, an operative connection between said meter mechanism and recording wheels, whereby the latter may be advanced from the former, resetting mechanism for said recording wheels, means for taking a record on a record sheet from said recording wheels, means actuated in said record-taking movement to disconnect the recording wheels from the meter mechanism and to connect them with the resetting mechanism, and means actuated on the return movement of said record taking means, for restoring the former connection and breaking the latter, substantially as described.

12. In an apparatus of the character described, the combination of meter mechanism, a series of recording wheels, a connection between said recording wheels and meter mechanism whereby said wheels are advanced by said meter mechanism, resetting wheels for respectively engaging the recording wheels, each recording wheel having a circular portion with a notch therein, and dogs adapted to respectively engage said notches to arrest the recording wheels at the zero position, and devices carried by said dogs and adapted to engage one another whereby said dogs are normally maintained out of engagement with the notches, and permitting to successively engage said notches only in an order corresponding with the order of the wheels, substantially as described.

13. In an apparatus of the character described, the combination of meter mechanism, a series of recording wheels, a connection between said recording wheels and meter mechanism whereby said wheels are advanced by said meter mechanism, resetting wheels for respectively engaging the recording wheels, each recording wheel having a circular portion with a notch therein, and dogs adapted to respectively engage said notches to arrest the recording wheels at the zero position, one of said dogs having an arm extending laterally and adapted to engage another dog and to hold the latter out of engagement with its notch until the former has engaged its notch, substantially as described.

14. In an apparatus of the character described, the combination of meter mechanism, a series of recording wheels on a common shaft, an operative connection between said mechanism and said wheels, whereby the latter are advanced from the former, a gear wheel carried by each recording wheel, resetting gear wheels adapted to be moved into engagement with said gear wheels on the recording wheels to reset the latter to zero, a common shaft for said resetting wheels and coiled springs connecting said resetting wheels with said shaft, substantially as described.

15. In an apparatus of the character described, the combination of meter mechanism, recording mechanism arranged to be advanced by said meter mechanism, a plate carrying said recording mechanism, date recording devices also carried by said plate, a casing for said mechanism and plate, said casing having a movable cover, and means actuated by the movement of said cover for moving said plate to take records from said recording and date recording mechanisms, substantially as described.

16. In an apparatus of the character described, the combination of meter mechanism, recording mechanism, an operative connection between said meter and recording mechanisms, a date recording mechanism, means for moving said recording mechanisms in unison to taking a record, means for automatically advancing said date recording mechanism at each movement thereof, and means for independently advancing said date recording mechanism by hand, substantially as described.

In testimony whereof I have hereunto set my hand in the presence of two subscribing witnesses.

RICHARD WILLIAM GALLAGHER.

Witnesses:
MURRAY M. HARRIS,
CHAS. E. GRAY.